May 18, 1965  E. C. ROLLINS  3,183,976
BEET ROW FINDER AND STEERING MECHANISM FOR BEET HARVESTERS
Filed July 16, 1962  6 Sheets-Sheet 2

INVENTOR:
EUGENE C. ROLLINS
BY
ATTORNEYS

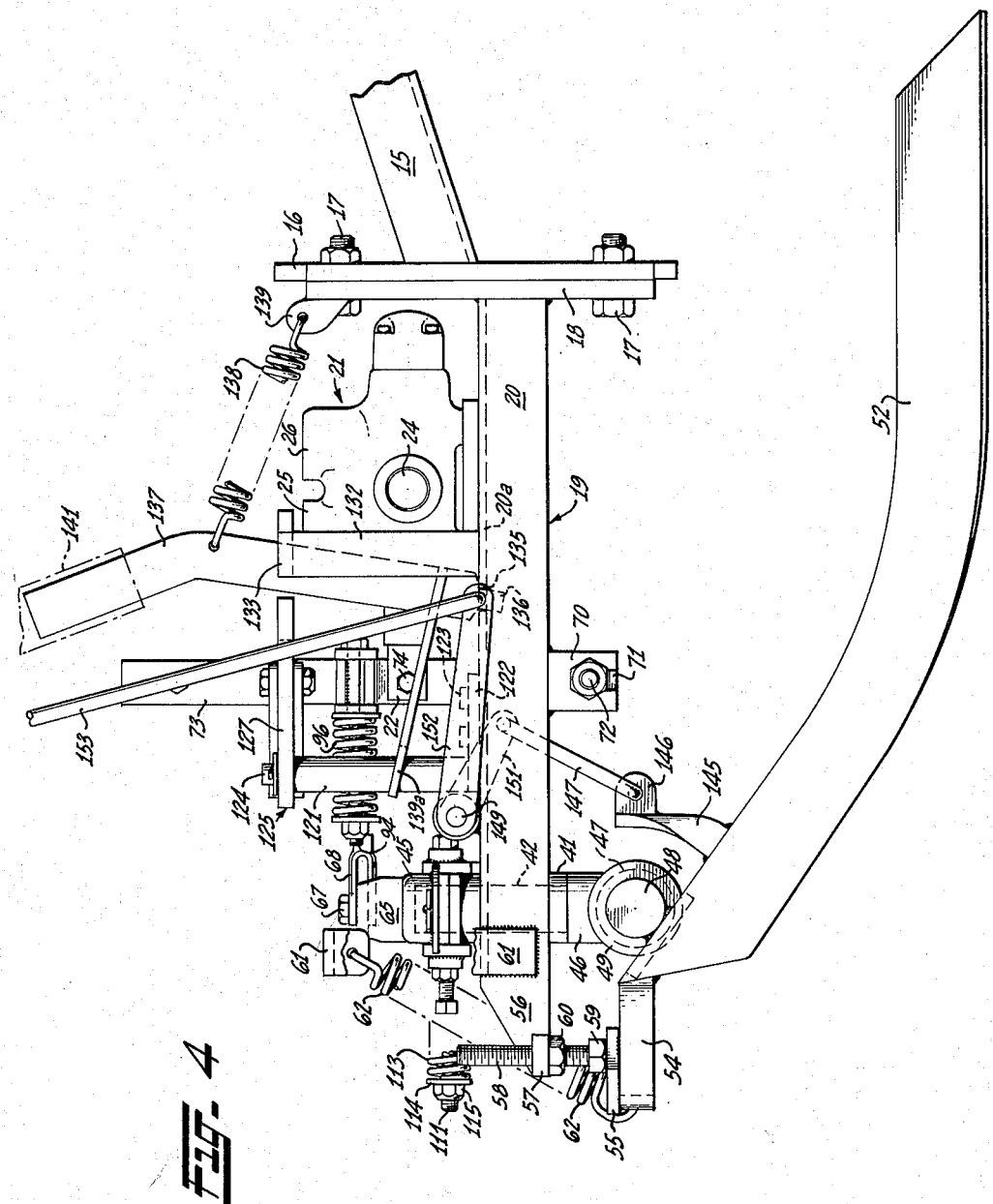

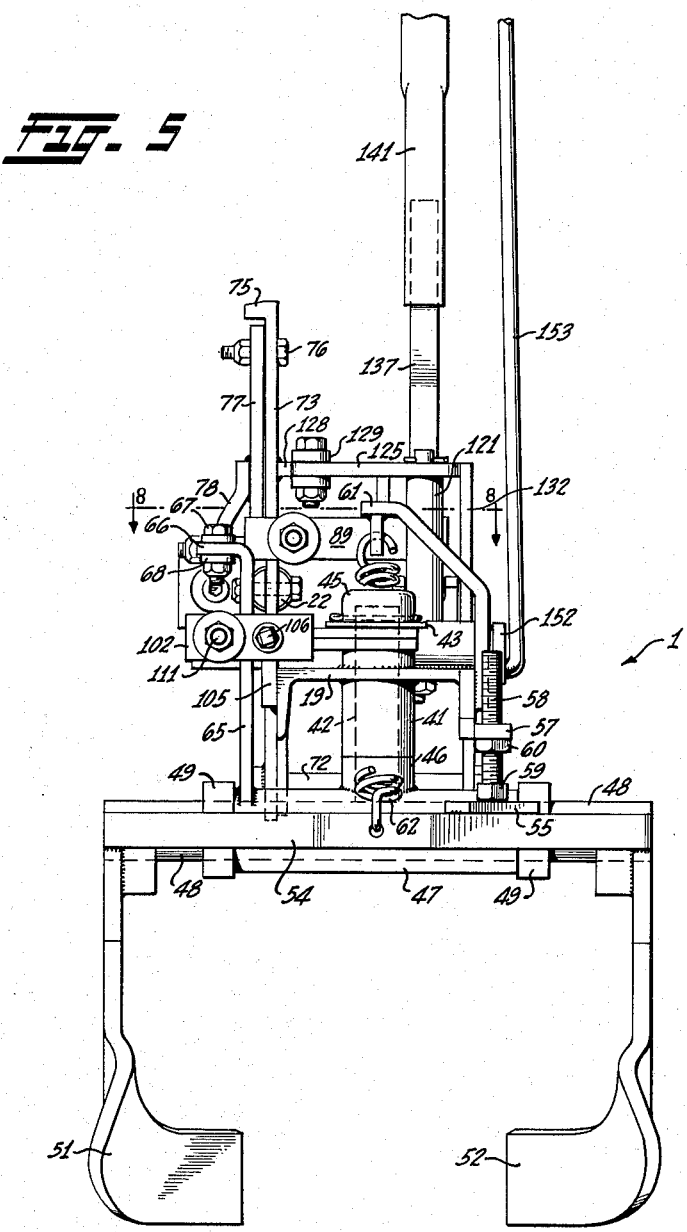

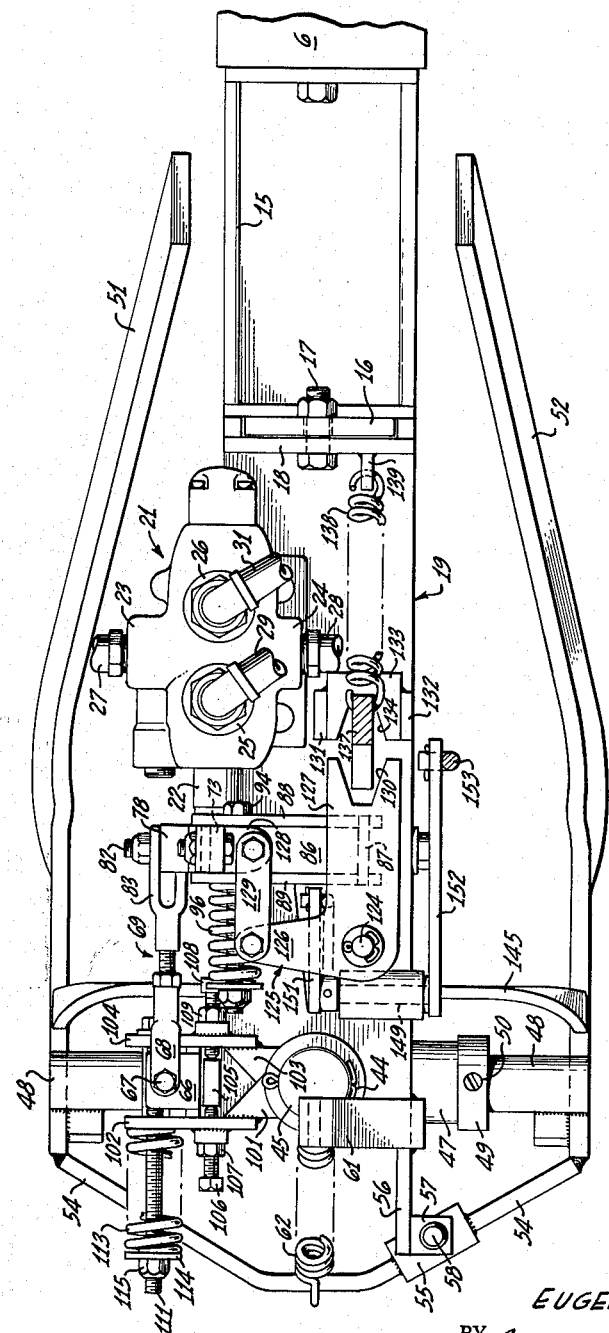

May 18, 1965  E. C. ROLLINS  3,183,976
BEET ROW FINDER AND STEERING MECHANISM FOR BEET HARVESTERS
Filed July 16, 1962  6 Sheets-Sheet 6
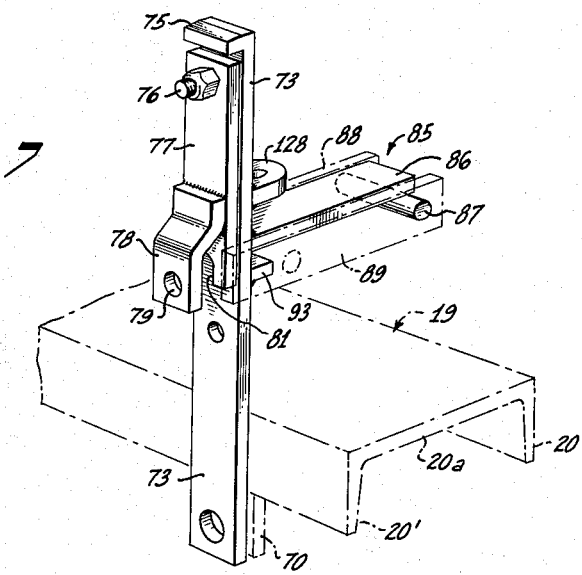
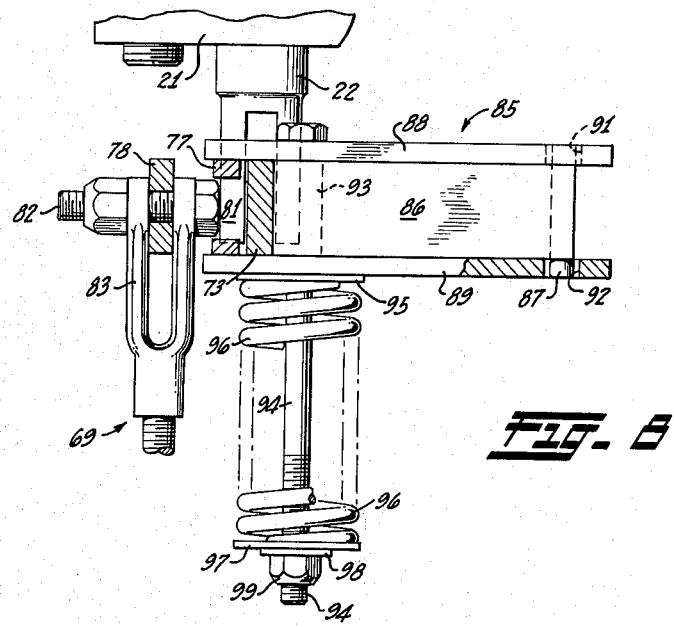
INVENTOR:
EUGENE C. ROLLINS
BY
ATTORNEYS United States Patent Office 3,183,976
Patented May 18, 1965

3,183,976
BEET ROW FINDER AND STEERING MECHANISM
FOR BEET HARVESTERS
Eugene C. Rollins, % General Machine Co.,
P.O. Box 1484, Ogden, Utah
Filed July 16, 1962, Ser. No. 210,009
8 Claims. (Cl. 171—8)

This invention relates to and in general has for its object the provision of a beet or beet row sensor for beet harvesters.

Beet harvesters when in operation are normally drawn by a tractor over the beet rows. Although the harvester will generally track with the tractor, it is nevertheless difficult, if not practically impossible, to maintain the harvester beet wheels properly aligned on the oncoming beets. To overcome this difficulty, and as is well known in the industry, various devices have been resorted to for sensing any misalignment between a beet harvester and an oncoming beet or beet row and for correcting said misalignment in response to said misalignment.

More specifically, one of the objects of this invention is the provision, in combination with a tractor-drawn beet harvester, of a hydraulic cylinder for varying the lateral angularity between the harvester and its draw-bar, a pair of beet or beet row finding fingers pivoted to the harveter and arranged during the operation of the latter to straddle a row of beets; valve means for controlling the hydraulic cylinder, and means responsive to the rotation of said finding fingers for actuating said valve means.

Another object of this invention is the provision of a device of the character above described wherein the said valve means and the means for controlling said valve means are connected through a lost-motion or overtravel connection permitting the beet finding fingers to move beyond the travel of the valve means.

Still another object of this invention is the provision of a device of the character above described wherein said finding fingers can be manipulated manually.

A still further object of this invention is the provision of a device of the character above described wherein means is provided for swinging the rear ends of said finding fingers upwardly and out of a beet row.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in other forms.

Referring to the drawings:

FIG. 4 is an enlarged right-hand fragmentary side elevation of the row finder and steering mechanism illustrated in FIG. 3.

FIG. 5 is a fragmentary front elevation of the mechanism shown in FIGS. 3 and 4.

FIG. 6 is an enlarged horizontal section taken on the section line 6—6 of FIG. 1.

FIG. 7 is a fragmentary perspective of the valve spool operating lever associated with the mechanism illustrated in the above figures and showing a portion of the lost-motion or overriding mechanism associated therewith.

FIG. 8 is a fragmentary horizontal section taken on the section line 8—8 of FIG. 5.

Figure 2:
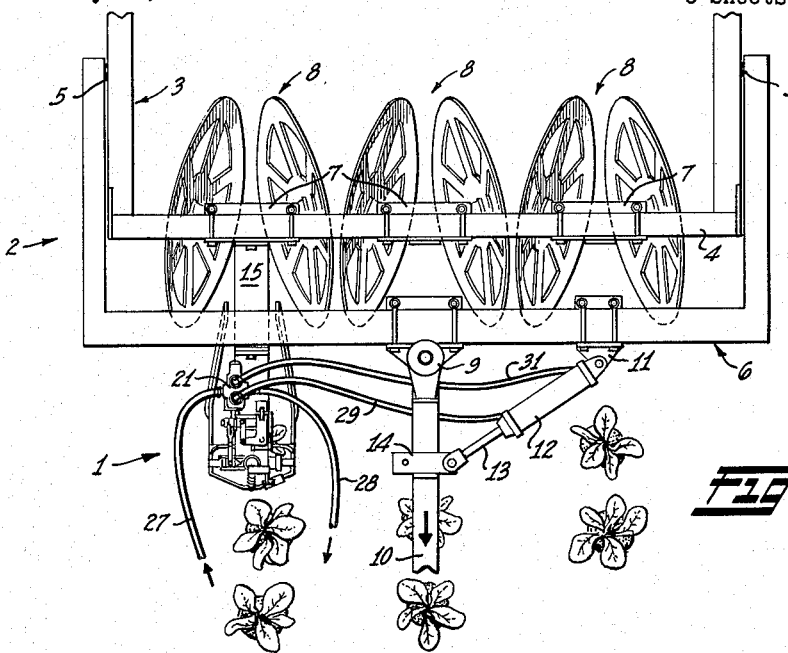
FIG. 2 is a fragmentary top plan view of a beet harvester equipped with a beet row finder and steering mechanism of the character illustrated in FIG. 1.

As best illustrated in FIG. 2, the beet row finder steering mechanism of my invention is generally indicated by the reference numeral 1 and constitutes an attachment for a beet harvester generally designated by the reference numeral 2.

The beet harvester 2 may be of any known construction, including a generally rectangular fabricated frame 3 including a front crossbeam 4. Pivoted to the sides of the frame 3 by bolts 5 are the side rails of a U-shaped frame 6. Mounted on the beam 4 are depending brackets 7, and journaled therein are a plurality of sets of beet-lifting wheels generally designated by the reference numeral 8. Fastened intermediate the ends of the frame 6 is a fitting 9, and pivoted thereto is a draw bar 10, the forward free end of which is arranged to be coupled to the rear end of a draft vehicle such as a tractor provided with a source of fluid under pressure.

Also mounted on the frame 6 to one side of the fitting 9 is a bracket 11, and pivoted thereto is a double-acting hydraulic cylinder 12 including a piston stem 13, the free end of which is pivoted to the draw bar 10 through an adjustable collar 14.

Bolted to one of the brackets 7 dead center of the left pair of beet wheels 8 (as viewed in FIG. 2) is a forwardly declining channel bracket 15 provided at its free end with a vertical, generally rectangular plate 16 (FIG. 4) serving as a supporting member for the beet row finding and automatic steering mechanism 1. Except for this supporting member, the harvester structure so far described is of well-known construction.

Operatively associated with the frames 3 and 6 is means such as a cylinder (not illustrated) for rotating the frame 6 relative to the frame 3 about the common axes of the bolts 5 and for fixing these two frames in any desired adjusted position. It is to be here understood that when the draw bar 10 is secured to a draft vehicle, the elevation of the crossbar of the frame 6 is fixed and that therefore the adjustment of the frame 3 relative to the frame 6 serves to determine the elevation of the beet wheels 8 relative to the ground.

Secured to the supporting plate 16 by bolts 17 for limited vertical adjustment is a mating plate 18 provided with a forwardly extending sensing frame comprising an inverted channel member 19 including opposed vertical sides 20 and 20' and a horizontal crossweb 20a. Mounted on the channel member 19 is a conventional four-way hydraulic valve 21 including a reciprocating spool 22, and provided with a hydraulic pressure inlet 23, a return outlet 24, a cylinder connection 25, and a cylinder connection 26. The hydraulic pressure inlet 23 communicates through a flexible hose line 27 with the above-mentioned source of fluid under pressure located on the draft tractor. The outlet 24 communicates through a flexible return line 28 with the sink of the source of fluid pressure. The connection 25 communicates through a flexible line 29 with one end of the hydraulic cylinder 12 and the other connection 26 communicates through a flexible line 31 with the other end of the cylinder 12. As above stated, the valve 21 is of well-known construction and is purchasable under the name Gresen 4-Way Valve—"400 Series," an open spool relief valve set for a maximum pressure of 1500 p.s.i. The spool 22 of this model valve has a stroke or travel in the order of ¼ inch. As is normal with valves of this character, its spool 22 is spring-biased to its neutral or closed position. Upon the forward (left-hand) movement of the spool 22 as viewed in FIGS. 1 and 4, it establishes communication between inlet 23 and the connection 25 and through the flexible line 29 with the outer end of the cylinder 12. Simultaneously, the inner end of the cylinder 12 is connected through the flexible line 31 with the connection 26 and the fluid pressure return line 28. In this position of the valve, hydraulic fluid entering the outer end of the cylinder 12 serves to move the frame 3 in a clockwise direction relative to the draw-bar 10. Movement of the valve spool 22 to the right as viewed in FIGS. 1 and 4 reverses the position of the valve so as to result in a counterclockwise movement of the frame 3 relative to the draw-bar 10.

Movement of the valve spool 22 is under the control of either the beet-sensing mechanism through the overriding mechanism or manually through the mechanism to be presently described.

To this end, and for both types of control, a vertical bearing sleeve 41 extends centrally through the forward end of the web of the inverted channel 19 and is welded thereto. Journaled in the sleeve 41 for rotation therein is a pin 42. Mounted over the upper end of the pin 42 and overlying the upper end of the vertical bearing sleeve 41 is a washer 43, and extending diametrically through the pin 42 above the washer 43 is a cotter pin 44. Disposed over the upper end of the pin 42 and welded to the upper face of the washer is a dust bonnet 45.

Rigidly fixed to the lower end of the pin 42 is a central vertical sleeve extension 46 of a horizontal bearing sleeve 47. Journaled in the bearing sleeve 47 is a pin 48, and adjustably mounted over each end thereof is a lock collar 49 by means of which, and by a set screw 50, the longitudinal position of the pin 48 can be adjusted relative to its bearing sleeve 47.

Welded to the ends of the pin 48 for rotation therewith are the forward ends of a pair of spaced, rearwardly converging and downwardly extending beet-finding fingers 51 and 52 which, due to their length, have a limited degree of flexibility. The transverse spacing between the free ends of the fingers 51 and 52 should be in the order of the diameter of the upper bulbous end of an average beet so that when the fingers 51 and 52 are properly aligned with respect to a beet, both sides of the beet will be engaged by one of the fingers 51 and 52 with substantially equal pressure.

As a result of this construction it will be seen that the beet fingers 51 and 52 are capable of a compound movement; they can rotate as a unit in a generally horizontal plane about the axis of the vertical pin 42 and they can be independently rotated in a generally vertical plane about the axis of the horizontal pin 48.

Welded to the forward ends of finding fingers 51 and 52 is an arcuate yoke 54, and welded to one side thereof is stop plate 55. Extending forwardly of the front end of the inverted channel side 20 in alignment with the stop plate 55 is a bracket 56 provided with an offset horizontal foot 57, and threaded therein is an inverted bolt 58 having a head 59 arranged to seat on the stop plate 55 and so limit the clockwise rotation of the finding fingers 51 and 52 as viewed in FIG. 4. Threaded on the bolt 58 in contact with the lower face of the foot 57 is a lock nut 60. Welded to the forward end of the inverted channel frame 19 is an overhanging bracket 61. Attached to the upper, outer end of the bracket 61 is the upper end of a tension spring 62, the lower end of this spring being anchored to the central portion of the yoke 54. As a result of this construction the spring 62 serves to bias the free ends of the beet-finding fingers 51 and 52 counterclockwise, as viewed in FIG. 3, about the axis of the pin 48, and the bolt head 59 of the bolt 58 serves to limit the biased position of the finding fingers. The normal level of the free ends of the finding fingers 51 and 52 should be such that they slide over beet hills under the biasing action of the spring 62 with their inner faces arranged to engage the upper sides of the beets. Alternately the finding fingers 51 and 52 can be made to sense the crown of the hill rather than the beets per se.

If, when approaching a beet, the finding fingers 51 and 52 are not in alignment therewith, contact by one of the fingers with one side of a beet will cause the beet wheel finder assembly to rotate in one direction or the other about the axis of its vertical pin 42 and this rotary movement of the finding finger assembly can be taken advantage of to operate the valve 21 and thus bring the harvester and its finding finger assembly back into alignment with that portion or increment of the beet row then being traversed.

To effect control of the valve 21 in response to the rotation of the finding finger assembly, there is welded to the left end of the journal sleeve 47, as viewed in FIG. 5, an upstanding lever arm 65 provided at its upper end with an outwardly extending bracket 66. Straddling the bracket 66 and pivoted thereto by a bolt 67 is the bifurcated end 68 of a turnbuckle 69.

Figure 3:
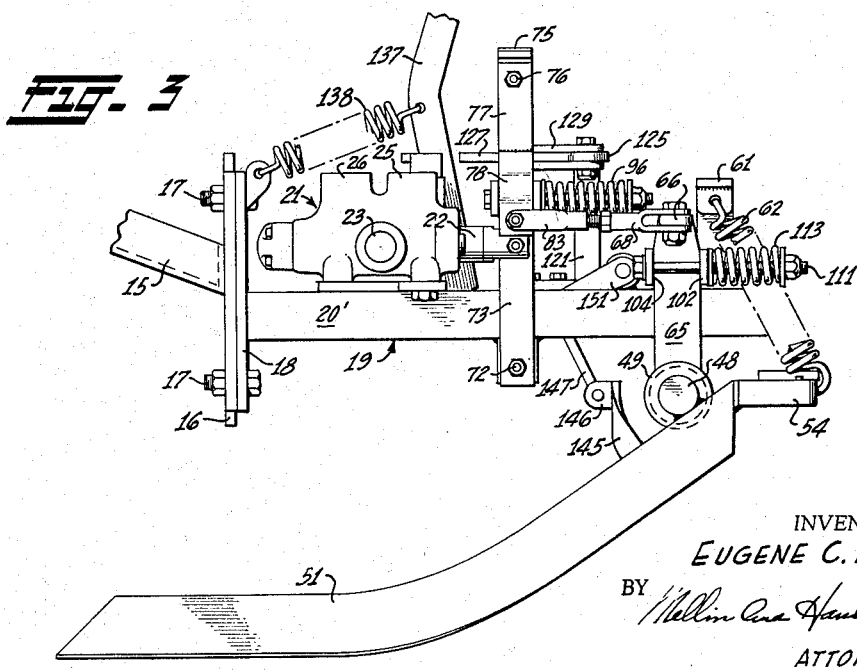
FIG. 3 is a fragmentary left-hand side elevation of a row finder and steering mechanism embodying the objects of my invention.

Fixed to and depending from the side 20' of the inverted channel member 19 intermediate its ends is an ear 70 provided at its lower end with an open slot 71 (FIGS. 4 and 7). Pivoted to the ear 70 by a bolt 72 receivable in the slot 71 is an upstanding valve lever 73. The free end of the valve spool 22 is bifurcated, straddles the valve lever 73 intermediate its ends, and is pivoted thereto by a bolt 74 (FIGS. 3 and 4). As a result of this linkage, movement of the valve lever 73 about the axis of the bolt 72 will be imparted to the valve spool 22 and thus cause the valve to control the hydraulic cylinder 12.

Pivoted to the overturned upper end 75 of the valve lever 73 by a bolt 76 is a lost-motion lever arm 77 (FIG. 7). Welded to the lower end of the lever 77 is an offset finger 78 provided with a bore 79 in axial alignment with an open slot 81 formed in the lower end of the lever arm 77, the diameter of said slot being substantially greater than the diameter of the bore 79. Straddling the offset finger 78 and pivoted thereto by a bolt 82 is the forked link 83 of the turnbuckle 69, and here it should be noted from an inspection of FIGS. 7 and 8 that the open slot 81 formed in the lever 77 serves to accommodate the head of bolt 82.

Operatively associated with the lever 73 and the lever 77 is a lost-motion or overriding assembly generally designated by the reference numeral 85 (FIGS. 7 and 8). Included in this assembly is a horizontal bar 86 welded at its inner end to the lever 73, and welded to the outer end thereof is a pin 87, the ends of which protrude beyond the bar 86. Disposed on either side of the bar 86 are plates 88 and 89 provided at their outer ends with bores 91 and 92 arranged to loosely receive the pivoted ends of the pin 87. Welded to the lever 73 within the confines of the two plates 88 and 89 and paralleling the bar 86 is a ledge 93. Extending loosely through another pair of aligned bores formed in the plates 88 and 89 adjacent the lever 73 is a long bolt 94 loosely accommodated between the bar 86 and the ledge 93 (FIG. 8). Surrounding the bolt 94 in contact with the outer face of the plate 89 is a washer 95. Abutting said washer and surrounding the bolt 94 is a compression spring 96. Seated against the free end of the spring 96 is a washer 97, and seated against the washer 97 is a small washer 98. Threaded on the end of the bolt 94, and engaging the washer 98, is a nut 99 for adjusting the compression of the spring 96.

As a result of this construction, it will be seen that if rotation is imparted to the beet finder fingers 51 and 52, this motion will be transmitted through the turnbuckle 69 to the lever arm 77. Such movement of the lever arm 77 with then be transmitted through the biasing action of the spring 96 and either one or the other of the plates 88 or 89 to the valve spool control lever 73, and thus to the valve spool 22 per se. The spring 96 serves normally to hold the left-hand ends of the plates 88 and 89 as viewed in FIG. 8 in engagement with the valve control lever 73, as well as with the lower end of the lever 77, and to cause these two levers to move as a unit under the influence of the biasing action of the spring 96. The compression strength of the spring 96 should be sufficient to hold the two levers together during the limited movement of the valve spool 22. However, when the valve spool 22 has reached the limit of its movement in either direction, the spring 96 can be compressed so as to permit the continued movement of the lever 77 in either direction, at least to a limited extent. As a result of this construction, the finding fingers 51 and 52 are permitted to continue to rotate through an additional number of degrees, even though the valve spool 22 has reached the limit of its movement in either direction. This then allows for a greater adjustment of the finding fingers 51 and 52 than can take place under the control of the valve 21.

Journaled on the pin 42 beneath the washer 43 is a radially extending finger 101, and welded thereto is a vertical plate 102 disposed adjacent the edge of the lever arm 65. Similarly, journaled on the pin 42 is a radially extending finger 103, and welded thereto is a vertical plate 104 disposed adjacent the inner side of the lever 65 and paralleling the plate 102 (FIGS. 3 and 6). Welded to the side 20' of the channel 19 is an upstanding bar 105 loosely straddled by the plates 102 and 104 intermediate the ends thereof (FIGS. 5 and 6). Threaded through the plate 102 is a stop screw 106 arranged to contact the outer edge of the bar 105, and threaded on the screw 106 exteriorly of the plate 102 is a lock nut 107. Similarly, a screw 108 is threaded through the plate 104 arranged to engage the inner edge of the bar 105, and threaded on the screw 108 is a locknut 109. Extending loosely through bores formed in the outer ends of the plates 102 and 104 is a bolt 111, and circumscribing the outer end thereof external of the plate 102 is a compression spring 113, the outer end of which engages a washer 114 held in adjustable position by a nut 115. As a result of this construction the rotation of the lever arm 65 about the vertical axis of the pin 42 can take place only against the biasing action of the compression spring 113. Consequently, this spring serves to bias the lever 65 and therefore the beet finder fingers 51 and 52 to their neutral position in alignment with the axis of the channel frame 19. It will therefore be seen that the spring 113 serves to return the finding assembly and its valve 21 to their normal and neutral positions.

As so far described, this machine operates to change the angularity between the harvester and its draw bar 10 only in response to a misalignment of a beet (or a beet hill) relative to the beet finding fingers 51 and 52 as sensed by either of these fingers, and only to the extent permitted by the stroke of the valve spool 22.

On occasions it is desired to manually adjust the angularity between the harvester and the beet-finding fingers 51 and 52 about the axis of the pin 42 within the limits permitted by the stroke of the valve spool 22.

To this end, an upstanding post 121 having a flanged foot 122 is secured to the web 20a of the frame 19 by bolts 123 (FIG. 4). As illustrated in FIG. 5, the post 121 is located adjacent the right side of the frame 19 as viewed from the front of the harvester. Pivoted to an extension 124 of the upper end of the post 121 is a generally right angular crank 125 including a transversely extending arm 126 and the longitudinally extending arm 127. Connecting the outer end of the arm 126 and a lug 128 formed integrally and extending inwardly from the valve control lever 73 is a link 129.

Formed on the outer end of the arm 127 is a V-shaped notch 130. Welded to the member 19 in alignment with the arm 127 are a pair of upstanding feet 131 and 132 (FIGS. 4 and 6), and extending across the top of these feet and welded thereto is a plate 133 located on a level with the arm 127 and provided with a V-shaped notch 134 complementary and opposed to the notch 130 and spaced rearwardly thereof. Formed in the web 20a of the member 19 in vertical alignment with the notches 130 and 134 is a hole 135 (FIG. 4), and loosely fitted therein is a pin 136 formed on the lower end of an upstanding arm 137 selectively receivable within the notches 130 and 134. Secured to the arm 137 above the level of the lever arm 127 is one end of a tension spring 138, the other end of this spring being anchored to a lug 139 welded to the plate 18 secured to the rear end of the member 19. The spring 138 serves to bias the arm 137 rearwardly to a position within the confines of the rear notch 134 and entirely clear of the forward notch 130. In this position, then, the arm 137 is entirely out of engagement with the crank arm 127. Welded to the lower end of the arm 137 is a forwardly extending bracing arm 139a having a notched forward end straddling the post 121.

Mounted over the upper free end of the arm 137 is an operating arm 140 terminating in a handle 141, located in close proximity to the operator's station on the harvester. If the operator, through the handle 141, moves the arm 137 forwardly of the harvester as viewed in FIGS. 1 and 6, the arm 137 will become engaged within the confines of the forward notch 129 free and clear of the notch 134. In this position the operator can then move the arm 137 transversely in either direction so as to rotate the crank 125 about the axis of the post 121. The rotation of the crank 125 about this axis serves to move the link 129 longitudinally of the unit and, in so doing, actuates the valve control lever 73. The movement of the lever 73 about the axis of the bolt 72 is, of course, limited by the stroke of the valve spool 22. However, even after the valve spool 22 has reached the limit of its movement in either direction, the beet finding fingers 51 and 52 can still move through a further increment as permitted by the overriding or lost-motion connection between the lever 73 and the lever 77, and which is connected through the turnbuckle 69 to the shaft 48 carrying the beet fingers 51 and 52. As a result of this arrangement, the operator can take over the manual operation of the device and incline the harvester relative to its draw bar 10 as desired for aligning the beet finding fingers 51 and 52 with an oncoming row of beets or to compensate for a beet which is too far out of alignment to be normally sensed by the fingers 51 and 52. Upon actuation of the valve spool 22 in either direction, the cylinder 12 is activated so long as the valve spool 22 holds the valve 21 in its open position. This causes the harvester to be angled with respect to the draw bar 10 in either direction to an extent within the limits of the stroke of the cylinder 12 and serves to bring the harvester and the finding unit into proper alignment. This automatically brings the finding fingers into their normal centered position and as a result the valve spool 22 is returned to its neutral position with the valve closed. As a result of this the harvester is locked in its newly oriented position relative to the draw bar 10 and remains in this position until the finding fingers 51 and 52 can sense that they and the harvester are out of alignment with the oncoming beet. When this occurs, the existing deviation is sensed by the finding fingers, which can actuate the valve spool 22 to correct the deviation and can bring the harvester and beet finding fingers 51 and 52 into alignment with an oncoming beet. The manual control of the device is taken over by the operator normally in two situations: first, when the harvester is entering a beet row and there is some misalignment between the row of beets and the harvester, and secondly, when progressing down the row of beets, one or more beets are found to be out of alignment with the harvester to such an extent that, unless the harvester were inclined relative to the draw bar, the finding fingers 51 and 52 would be so out of alignment with an oncoming beet that it would not serve to sense its misalignment.

Here it should be noted that the manual rotation of the crank 125 serves not only to move the valve spool 22 and thus actuate the cylinder 12, but also serves to rotate the finding fingers 51 and 52. This means that when the crank 125 is manually released the valve spool 22 returns to its neutral position, closing the valve 21 and thus locking the harvester to the draw bar 10 in a new position. At this point, the fingers 51 and 52 will rotate to their neutral position. However, this return movement of the finding fingers 51 and 52 to their neutral position is slight as compared with the movement of the harvester relative to its draw bar, and as a consequence the finding fingers 51 and 52 are still in spaced alignment with an oncoming beet so as to sense any deviation in alignment of an oncoming beet.

When the control valve 21 is being manually operated by the arm 140 for the purpose of bringing the harvester into substantial alignment with a row of beets, or when the harvester is being moved from one beet row to another, it is desirable that the finding fingers 51 and 52 be elevated sufficiently to clear the ground.

Figure 1:
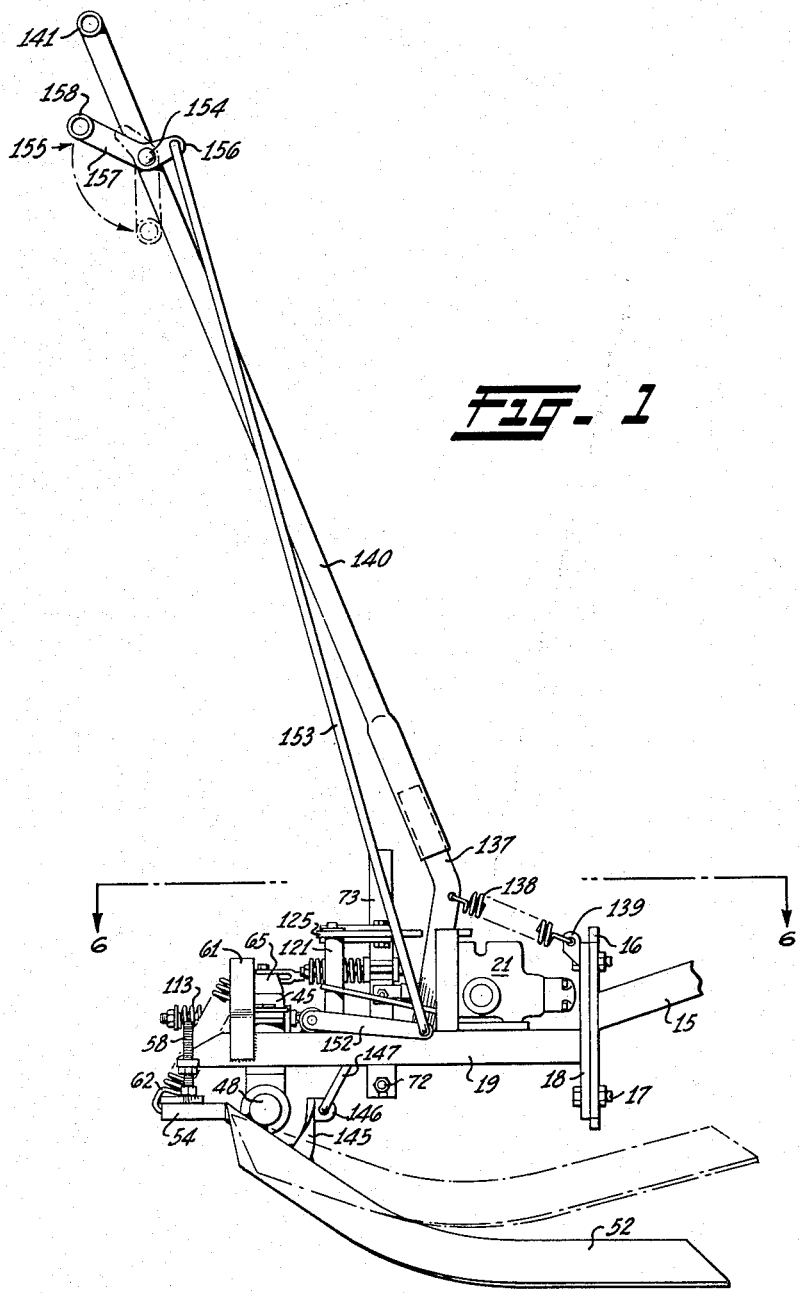
FIG. 1 is a right-hand side elevation of a beet row finder embodying the objects of my invention.

To this end a yoke 145 is welded to and across the forward ends of the finding fingers 51 and 52 but rearwardly of the shaft 48 (FIG. 1). Formed centrally of the yoke 145 is a lug 146 and fastened thereto is the lower end of a link 147. Welded to the top of the channel 19 substantially in vertical alignment with the lug 146 is a transversely extending sleeve bearing 148, and journaled therein is a crank 149 (FIG. 6) having an inner crank arm 151 and an outer crank arm 152. The free end of the inner crank arm is pivoted to the free end of the link 147 and the free end of the outer crank arm 152 is pivoted to the lower end of a stiff rod 153 (FIG. 1). Pivoted to the arm 140 by a pin 154 is an off-center crank 155 including a crank arm 156 and a crank arm 157 terminating in a handle 158. As best shown in FIG. 1, the upper end of the rod 153 is linked to the free end of the crank arm 156.

As a result of this construction, a counterclockwise rotation of the crank arm handle 158 as viewed in FIG. 1 will result in elevating the rod 153 and in rotating the crank arms 151 and 152 counterclockwise. Since the upper end of the link 147 is fastened to the crank 151, this all results in elevating the finding fingers 51 and 52 to their dash-line position as illustrated in FIG. 1.

Although this adjustment of the finding fingers is ordinarily resorted to only when the harvester is transported to a beet row, it can of course be used whenever desired.

I claim:

1. A beet row finder and harvester steering mechanism comprising: a sensing frame; a four-way valve mounted on said frame including a reciprocable valve actuator and resilient means for biasing said actuator to a neutral position; a pair of transversely spaced ground engaging beet row finding fingers; means for pivotally mounting said fingers to said frame on horizontal and vertical axes, said fingers being arranged to straddle a beet row; an overtravel linkage connected between said fingers and said actuator for moving said actuator in either direction in response to the rotation of said fingers about said vertical axis and for permitting a further rotation of said fingers beyond the limits of movement of said actuator; means for manually pivoting said fingers upon said horizontal axis and elevating said fingers relative to said frame; and means mounted on said frame for manually pivoting said fingers in either direction upon said vertical axis.

2. A beet row finder and harvester steering mechanism comprising: a sensing frame; a four-way valve mounted on said frame including a reciprocable valve actuator and resilient means for biasing said actuator to a neutral position; a pair of transversely spaced ground engaging beet row finding fingers; means for pivotally mounting said fingers to said frame on horizontal and vertical axes, said fingers being arranged to straddle a beet row; an overtravel connection between said fingers and said actuator for moving said actuator in response to the rotation of said fingers about said vertical axis; manually operable means mounted on said frame for operating said valve actuator in either direction; and means mounted on said frame for pivoting said fingers upon said horizontal axis and elevating said fingers relative to said frame.

3. In combination, a vehicle arranged to travel over a row crop and provided with a forwardly extending drawbar; a hydraulic cylinder connected at one end to the frame of said vehicle and connected at its other end to said draw-bar intermediate the ends thereof; a sensing frame mounted on said vehicle; a four-way valve mounted on said frame and operatively connected with said cylinder and with a source of hydraulic pressure, and provided with a valve actuator for selectively establishing communication between said source of hydraulic pressure and one or the other of the two ends of said cylinder; a pair of ground engaging finding fingers; means for pivotally mounting said finding fingers on said row finder frame on vertical and horizontal axes with the free ends of said fingers extending rearwardly of said vehicle and arranged to straddle a row of said row crop during the operation of said vehicle; an overtravel linkage connected between said fingers and said valve operator for actuating said valve operator in response to pivotal movement of said fingers upon said vertical axis; and manually operable means connectable to said valve actuator for manually operating said valve.

4. A device of the character set forth in claim 3 and further wherein means is provided for manually rotating said fingers about said horizontal axis thereby to elevate the rear ends thereof relative to said row finder frame.

5. A beet row finder and harvester steering mechanism comprising: a sensing frame; a four-way valve mounted on said frame including a reciprocable valve actuator and resilient means for biasing said actuator to a neutral position; a vertical bearing sleeve fixed to said frame; a pin journaled in said bearing sleeve; a horizontal bearing sleeve fixed to the lower end of said pin for rotation therewith; a shaft journaled in said horizontal sleeve bearing; a pair of ground engaging finding fingers fixed to the ends of said shaft for rotation therewith, said fingers being spaced apart and arranged to straddle a row of beets; an overtravel linkage connecting said fingers and said actuator for moving said actuator in response to the rotation of said fingers about the axis of said pin; means mounted on said frame for manually moving said valve actuator; and means mounted on said frame for manually rotating said fingers about the axis of said shaft.

6. A beet row finder and harvester steering mechanism comprising: a sensing frame; a four-way valve mounted on said frame including a reciprocable valve actuator and resilient means for biasing said actuator to a neutral valve position; a pair of ground engaging beet row finding fingers; means for pivotally mounting said fingers to said frame on horizontal and vertical axes, said fingers being arranged to straddle a beet row; an overtravel linkage connected between said fingers and said actuator for moving said actuator in either direction in response to the rotation of said fingers about said vertical axis and for permitting a further rotation of said fingers beyond the limits of movement of said actuator; a crank pivoted to said frame and linked at one end to said actuator; and means mounted on said frame and engageable with the other end of said crank for manually rotating said finding fingers through said overtravel linkage with the limits of movement of said valve actuator.

7. A beet row finder and harvester steering mechanism comprising: a sensing frame; a pair of spaced, parallel ground engaging beet row finding fingers journaled adjacent one end thereof on said frame for rotation on a vertical axis and for independent rotation on a horizontal axis; a four-way valve mounted on said frame and including a spool; a first actuating lever pivoted to said frame and connected intermediate its ends to said spool; a second lever fixed to said finding fingers for rotating the latter on said vertical axis; an overtravel linkage connected to said actuating lever; a connecting rod connecting said overtravel linkage with said second lever; and means pivoted to said frame for manually rotating said fingers about said horizontal axis.

8. The beet row finder of claim 7 and further including means for resiliently pivoting said fingers about said horizontal axis, urging them into engagement with the ground.

References Cited by the Examiner

UNITED STATES PATENTS

| | | | |
|---|---|---|---|
| 2,610,562 | 9/52 | Ward | 172—5 X |
| 2,981,355 | 4/61 | Rabuse | 172—5 X |

FOREIGN PATENTS 523,696  4/55  Italy.

T. GRAHAM CRAVER, *Primary Examiner.*

ANTONIO F. GUIDA, ARNOLD RUEGG, *Examiners.*